United States Patent
Saiki et al.

(10) Patent No.: US 12,209,523 B2
(45) Date of Patent: Jan. 28, 2025

(54) CONTROL METHOD FOR REDUCTANT GENERATION DEVICE, EXHAUST PURIFICATION METHOD, REDUCTANT GENERATION SYSTEM, AND EXHAUST PURIFICATION SYSTEM

(71) Applicant: NGK INSULATORS, LTD., Nagoya (JP)

(72) Inventors: Katsumi Saiki, Nagoya (JP); Yukinari Shibagaki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 122 days.

(21) Appl. No.: 18/191,025

(22) Filed: Mar. 28, 2023

(65) Prior Publication Data
US 2023/0235689 A1    Jul. 27, 2023

Related U.S. Application Data

(63) Continuation of application No. PCT/JP2021/021269, filed on Jun. 3, 2021.

(30) Foreign Application Priority Data

Nov. 9, 2020 (JP) .................................. 2020-186740

(51) Int. Cl.
*F01N 3/20* (2006.01)
*B01D 53/94* (2006.01)
*B01J 35/33* (2024.01)
(Continued)

(52) U.S. Cl.
CPC ....... *F01N 3/2073* (2013.01); *B01D 53/9431* (2013.01); *B01J 35/33* (2024.01);
(Continued)

(58) Field of Classification Search
CPC combination set(s) only.
See application file for complete search history.

(56) References Cited

U.S. PATENT DOCUMENTS 10,934,918 B1* 3/2021 Goffe ................. B01D 53/9427
2014/0047821 A1* 2/2014 Kawada ................ F01N 3/2066
60/299

(Continued)

FOREIGN PATENT DOCUMENTS

| JP | 2017-180299 A | 10/2017 |
|---|---|---|
| JP | 6487990 B2 | 3/2019 |
| WO | 2014/148506 A1 | 9/2014 |

OTHER PUBLICATIONS

International Search Report and Written Opinion (Application No. PCT/JP2021/021269) dated Aug. 24, 2021.
English translation of the International Preliminary Report on Patentability (Chapter I) dated May 19, 2023 (Application No. PCT/JP2021/021269).

*Primary Examiner* — Binh Q Tran
(74) *Attorney, Agent, or Firm* — BURR PATENT LAW, PLLC

(57) ABSTRACT

A method for controlling a reductant generation device 100, the reductant generation device 100 including: a sprayer 10 capable of spraying a reductant precursor 50; and a heater 20 comprising a ceramic substrate 21, the heater 20 being arranged on a downstream side of the sprayer 10 and capable of heating the reductant precursor 50 to generate a reductant 60. The method includes: a permeation step of spraying the reductant precursor 50 from the sprayer 10 and permeating the ceramic substrate 21 with the reductant precursor 50 when the heater is not heated; and after the permeation step, a heating step A of heating the reductant precursor 50 by the heater 20 and generating the reductant 60 while spraying the reductant precursor 50 from the sprayer 10.

12 Claims, 6 Drawing Sheets

(51) Int. Cl.
  *B01J 35/56*       (2024.01)
  *F01N 3/029*       (2006.01)
  *F01N 3/28*        (2006.01)

(52) U.S. Cl.
  CPC ............ *B01J 35/56* (2024.01); *F01N 3/2026* (2013.01); *F01N 3/2825* (2013.01); *F01N 3/2842* (2013.01); *B01D 2251/2067* (2013.01); *B01D 2255/20707* (2013.01); *B01D 2257/404* (2013.01); *F01N 3/0293* (2013.01); *F01N 3/0296* (2013.01); *F01N 2610/02* (2013.01); *F01N 2610/102* (2013.01); *F01N 2610/1453* (2013.01); *F01N 2900/04* (2013.01); *F01N 2900/0602* (2013.01); *F01N 2900/1602* (2013.01); *F01N 2900/1822* (2013.01)

(56) References Cited

U.S. PATENT DOCUMENTS

| | | | |
|---|---|---|---|
| 2014/0369890 A1* | 12/2014 | Hirabayashi | F01N 3/206 |
| | | | 422/119 |
| 2016/0017777 A1 | 1/2016 | Kasai et al. | |
| 2016/0017780 A1* | 1/2016 | Kinugawa | F01N 3/0871 |
| | | | 60/286 |
| 2017/0009633 A1* | 1/2017 | Silver | F01N 3/2066 |
| 2017/0241318 A1 | 8/2017 | Kasai et al. | |
| 2017/0284256 A1* | 10/2017 | Ishihara | B01D 53/90 |
| 2017/0284258 A1* | 10/2017 | Saiki | F01N 3/2026 |
| 2020/0018207 A1 | 1/2020 | Brugger et al. | |
| 2021/0030056 A1* | 2/2021 | Hwang | A24D 1/02 |

* cited by examiner

CONTROL METHOD FOR REDUCTANT GENERATION DEVICE, EXHAUST PURIFICATION METHOD, REDUCTANT GENERATION SYSTEM, AND EXHAUST PURIFICATION SYSTEM

CROSS REFERENCE TO RELATED APPLICATIONS

The present invention claims the benefit of priorities to Japanese Patent Application No 2020-186740 filed on Nov. 9, 2020 and PCT Patent Application No. PCT/JP2021/021269 filed on Jun. 3, 2021, the entire contents of which are incorporated herein by reference in its entirety.

FIELD OF THE INVENTION

The present invention relates to a control method for a reductant generation device, an exhaust gas purification method, a reductant generation system, and an exhaust gas purification system.

BACKGROUND OF THE INVENTION

Reductants can reduce other compounds in oxidation-reduction reactions, and are used for various applications. For example, in a urea SCR system, which is known as one of exhaust gas purification techniques, ammonia (reductant) generated by decomposing urea with heat of an exhaust gas is allowed to react with NOx to reduce it to nitrogen and water.

Conventional urea SCR systems require a temperature of an exhaust gas of 200° C. or more to generate ammonia from urea. If the temperature of the exhaust gas is lower, ammonia cannot be sufficiently produced from urea, resulting in an insufficient amount of ammonia required for the NOx treatment if the temperature of the exhaust gas is lower.

Therefore, Patent Literature 1 discloses a reductant injection device equipped with a honeycomb structure (hereinafter referred to as a "honeycomb heater") having a honeycomb structure portion and a pair of electrode portions disposed on a side surface of the honeycomb structure portion, and a urea spraying device for spraying an aqueous urea solution in a form of a mist, wherein an aqueous urea solution is sprayed into the honeycomb heater that is heated by electric conduction, thereby enabling sufficient ammonia to be generated even if the temperature of the exhaust gas is lower.

PRIOR ART

Patent Literature

[Patent Literature 1] Japanese Patent No. 6487990 B

SUMMARY OF THE INVENTION

The present invention relates to a method for controlling a reductant generation device, the reductant generation device comprising: a sprayer capable of spraying a reductant precursor; and a heater comprising a ceramic substrate, the heater being arranged on a downstream side of the sprayer and capable of heating the reductant precursor to generate a reductant, the method comprising:
  a permeation step of spraying the reductant precursor from the sprayer and permeating the ceramic substrate with the reductant precursor when the heater is not heated; and
  after the permeation step, a heating step A of heating the reductant precursor by the heater and generating the reductant while spraying the reductant precursor from the sprayer.

Further, the present invention relates to a method for purifying an exhaust gas, the method comprising bringing the reductant generated by the above method into contact with an exhaust gas containing NOx.

Further, the present invention relates to a reductant generation system, the reduction generation system comprising:
  a reductant generation device comprising: a sprayer capable of spraying a reductant precursor; and a heater comprising a ceramic substrate, the heater being arranged on a downstream side of the sprayer and capable of heating the reductant precursor to generate a reductant; and
  a control device comprising: a reductant precursor spray control unit for controlling spraying of the reductant precursor from the sprayer; and a heater control unit for controlling heating of the reductant precursor by the heater,
  wherein the reductant precursor spray control unit generates a control signal for spraying the reductant precursor from the sprayer when the heater is not heated, and controls the reductant generation system such that the ceramic substrate can be permeated with the reductant precursor.

Furthermore, the present invention relates to an exhaust gas purification system comprising the reductant generation system,
  wherein the reductant generation device is provided in an exhaust pipe through which an exhaust gas containing NOx can flow or in a branch pipe connected to the exhaust pipe.

DETAILED DESCRIPTION OF THE INVENTION

The reductant injection device according to Patent Literature 1 requires some times for the decomposition reaction of urea immediately after the aqueous urea solution is sprayed, resulting in a delay in the generation of ammonia (reductant). On the other hand, since the amount of NOx in the exhaust gas increases immediately after the engine is started, the delay in the production of ammonia causes reduced exhaust gas purification performance.

The present invention has been made to solve the above problems. An object of the present invention is to provide a control method for a reductant generation device and a reductant generation system, which can rapidly generate a reductant.

Another object of the present invention is to provide an exhaust gas purification method and an exhaust gas purification system, which can rapidly generate a reductant to perform exhaust gas purification immediately after an engine is started.

The above problems are solved by the present invention as described below.

According to the present invention, it is possible to provide a control method for a reductant generation device and a reductant generation system, which can rapidly generate a reductant.

Also, according to the present invention, it is possible to provide an exhaust gas purification method and an exhaust gas purification system, which can rapidly generate a reductant to perform exhaust gas purification immediately after an engine is started.

Hereinafter, embodiments according to the present invention will be specifically described. It is to understand that the present invention is not limited to the following embodiments, and various modifications and improvements, which will be within the scope of the present invention, may be made based on ordinary knowledge of a person skilled in the art, without departing from the spirit of the present invention.

Figure 1:
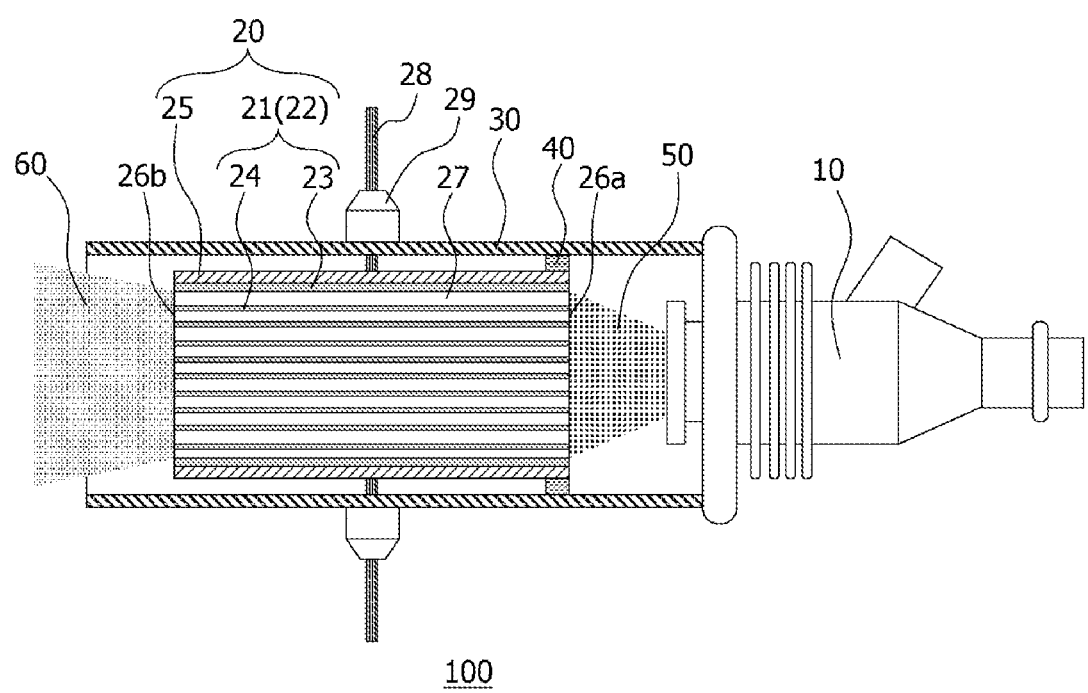
FIG. 1 is a schematic cross-sectional view showing a reductant generation device used in a control method for a reductant generation device and a reductant generation system according to an embodiment of the present invention.

FIG. 1 is a schematic cross-sectional view showing a reductant generation device used in a control method for a reductant generation device and a reductant generation system according to an embodiment of the present invention.

As shown in FIG. 1, a reductant generation device 100 includes: a sprayer 10 capable of spraying a reductant precursor 50; and a heater 20 including a ceramic substrate 21, the heater 20 being arranged on a downstream side of the sprayer 10 and capable of heating the reductant precursor 50 to produce a reductant 60.

Preferred embodiments of the reductant generation device 100 having such a structure will be described in detail for each component.

(1-1) Sprayer 10

A type of the sprayer 10 is not particularly limited as long as it can spray the reductant precursor 50, but it is preferably a solenoid type, an ultrasonic type, a piezoelectric actuator type, or an atomizer type. By using these, the reductant precursor 50 can be easily sprayed in a form of a mist. Also, among them, the solenoid type, ultrasonic type or piezoelectric actuator type is used, the reductant precursor 50 can be sprayed in the form of the mist without using air. Therefore, it is not necessary to heat the air used for spraying the reductant precursor 50, and the amount of energy for heating can be reduced. A droplet size (diameter) of the reductant precursor 50 sprayed from the sprayer 10 is preferably 0.3 mm or less. If the droplet size of the reductant precursor 50 is larger than 0.3 mm, it may become difficult to vaporize when the ceramic substrate 21 is heated.

Here, the solenoid type sprayer 10 is a device for spraying the reductant precursor 50 in the form of the mist by back-and-forth movement of a piston by vibration of a solenoid or an electric field using the solenoid. The ultrasonic type atomizer 10 is a device for spraying the reductant precursor 50 in the form of the mist by ultrasonic vibration. The piezoelectric actuator type sprayer 10 is a device for spraying the reductant precursor 50 in the form of the mist by vibrating a piezoelectric element. The atomizer type sprayer 10 is, for example, a device for sucking up the reductant precursor 50 through a tube, while blowing off the reductant precursor 50 with air from openings at the tip of the tube to spray the reductant precursor in the form of the mist. It should be noted that the atomizer type sprayer 10 may be a device that forms a plurality of small openings at the tip of a nozzle and sprays the reductant precursor 50 in the form of the mist from the openings.

For example, when the ceramic substrate 21 is a pillar shaped ceramic honeycomb substrate 22 as shown in FIG. 1, the sprayer 10 is preferably configured so that a direction of spraying the reductant precursor 50 (a direction in which droplets are ejected) faces a first end face 26 side of the pillar shaped ceramic honeycomb substrate 22 in order to easily spray the reductant precursor 50 toward the first end face 26 side of the pillar shaped ceramic honeycomb substrate 22.

(1-2) Heater 20

The heater 20 is not particularly limited, but as shown in FIG. 1, it preferably includes: the pillar shaped ceramic honeycomb substrate 22 having an outer peripheral wall 23, a partition wall 24 arranged on an inner side of the outer peripheral wall 23, the partition wall 24 defining a plurality of cells 27, each of the cells 27 forming a flow path from the first end face 26a to a second end face 26b; and a pair of electrode portions 25 arranged on a side surface of the pillar shaped ceramic honeycomb substrate 22. The heater 20 having such a structure can allow the pillar shaped ceramic honeycomb substrate 22 to be energized to generate heat when a voltage is applied to the pair of electrode portions 25. Further, since the heater 20 having such a structure can have an increased surface area, it is possible to heat the reductant precursor 50 and generate the reductant 60 with less energy.

(1-1) Pillar Shaped Ceramic Honeycomb Substrate 22

The outer peripheral wall 23 and partition wall 24 forming the pillar shaped ceramic honeycomb substrate 22 may preferably be made of ceramics, although not particularly limited thereto. They preferably contain a silicon-silicon carbide composite material or silicon carbide as a main component, and more preferably a silicon-silicon carbide composite material as a main component. The use of such a material can allow electrical resistivity of the pillar shaped ceramic honeycomb substrate 22 to be easily adjusted to any value by changing a ratio of silicon carbide and silicon.

As used herein, the "silicon-silicon carbide composite material" means a material containing silicon carbide particles as an aggregate and metallic silicon as a binding material for binding silicon carbide particles. In the silicon-silicon carbide composite material, it is preferable that a plurality of silicon carbide particles are bonded by metallic silicon. Further, the "silicon carbide" means a material formed by sintering silicon carbide particles. Furthermore, as used herein, the "main component" means a component contained in an amount of 90% by mass or more.

The pillar shaped ceramic honeycomb substrate 22 preferably has an electrical resistivity of from 0.01 to 500 Ωcm, and more preferably from 0.1 to 200 Ωcm, although not particularly limited thereto. The control of the electrical resistivity to such a level can effectively heating the pillar shaped ceramic honeycomb substrate 22 by applying a voltage to the pair of electrode portions 25. More particularly, in order to heat the pillar shaped ceramic honeycomb substrate 22 to 160 to 600° C. using a power source having a voltage of from 12 to 200 V, the electrical resistivity is preferably in the above range.

The electrical resistivity of the pillar shaped ceramic honeycomb substrate 22 is a value at 25° C. The electrical resistivity of the pillar shaped ceramic honeycomb substrate 22 is a value measured by a four-terminal method.

The pillar shaped ceramic honeycomb substrate 22 preferably has a surface area per unit volume of from 5 $cm^2/cm^3$ or more, and more preferably from 8 to 45 $cm^2/cm^3$, and particularly preferably from 20 to 40 $cm^2/cm^3$. The surface area of 5 $cm^2/cm^3$ or more can allow a sufficient contact area with the reductant precursor 50 to be ensure, thereby appropriately controlling a treatment rate of the reductant precursor 50, i.e., an amount of the reductant 60 generated (a generation rate).

It should be noted that the surface area of the pillar shaped ceramic honeycomb substrate 22 is an area of the surface of the partition wall 24 of the pillar shaped ceramic honeycomb substrate 22.

From the viewpoint of permeating the pillar shaped ceramic honeycomb substrate 22 with the reductant precursor 50 in a permeation step that will be described later, the total pore volume of the pillar shaped ceramic honeycomb substrate 22 is preferably 0.3 cc to 100 cc. It should be noted that a required amount of the reductant significantly varies depending on the size of an internal combustion engine such as an engine in which the reductant generation device 100 is used, so that the total volume of the pillar shaped ceramic honeycomb substrate 22 also varies. The total pore volume increases depending on the total volume of the pillar shaped ceramic honeycomb substrate 22.

The partition wall 24 of the pillar shaped ceramic honeycomb substrate 22 preferably has a thickness of from 0.06 to 1.5 mm, and more preferably from 0.10 to 0.80 mm. The thickness of the partition wall 24 of 1.5 mm or less can reduce a pressure loss, thereby appropriately controlling the treatment rate of the reductant precursor 50, i.e., the amount of the reductant 60 generated (generation rate). The thickness of the partition wall 24 of 0.06 mm or more can prevent the pillar shaped ceramic honeycomb substrate 22 from being destroyed by a thermal shock caused by electric conduction heating.

When the shape of each cell 27 (the shape of the cross section orthogonal to the extending direction of the cells 27) is circular, the thickness of the partition wall 24 means a thickness of a portion where "a distance between the cells 27 is the shortest (a portion where the thickness of the partition wall 27 is lower)".

The cells 27 preferably have a density of from 7 to 140 cells/$cm^2$, and more preferably from 15 to 120 cells/$cm^2$. The density of the cells 27 of 7 cells/$cm^2$ or more can allow a sufficient contact area with the reductant precursor 50 to be ensured, thereby appropriately controlling the treatment rate of the reductant precursor 50, i.e., the amount of the reductant 60 generated (generation rate). The density of the cells 27 of 140 cells/$cm^2$ or less can reduce the pressure loss, thereby appropriately controlling the treatment rate of the reductant precursor 50, i.e., the amount of the reductant 60 generated (generation rate).

The pillar shaped ceramic honeycomb substrate 22 may have some cells 27 provided with plugged portions at the end portion on the first end face 26a side. The material of the plugged portions is preferably the same as that of the partition wall 24, but other materials may be used.

A shape of the first end face 26a may be various shapes such as a square, a rectangle, or other polygons, a circle, and an ellipse, although not particularly limited thereto. Further, the shape of the first end face 26a is the same as that of the second end face 26b, and preferably as the shape of the cross section orthogonal to the extending direction of the cells 27.

The size of the pillar shaped ceramic honeycomb substrate 22 is such that the areas of the first end face 26a and the second end face 26b are from 50 to 10000 $mm^2$, respectively, and more preferably from 100 to 8000 $mm^2$, respectively.

The shape of each cell 27 in the cross section orthogonal to the extending direction of the cells 27 is preferably a circle, an ellipse, a quadrangle, a hexagon, an octagon, or a combination thereof. Such a shape can reduce the pressure loss when the exhaust gas is passed through the pillar shaped ceramic honeycomb substrate 22, thereby efficiently decomposing the reductant precursor 50.

The pillar shaped ceramic honeycomb substrate 22 may be provided with a catalyst (for example, a urea hydrolysis catalyst) that hydrolyzes the reductant precursor 50. By using such a catalyst, the reductant 60 can be efficiently generated from the reductant precursor 50. Examples of such a catalyst include titanium oxide and the like.

(1-2-2) Electrode Portions 25

The pair of the electrode portions 25 are arranged such that in a cross section orthogonal to the extending direction of the cells 27 of the pillar shaped ceramic honeycomb substrate 22, one electrode portion 25 is arranged on the opposite side of the other electrode portion 25 across a central axis of the pillar shaped ceramic honeycomb substrate 22. Also, the pair of the electrode portions 25 are preferably formed in a form of a band along the extending direction of the cells 27. Such a configuration can allow any bias of the current flowing in the pillar shaped ceramic honeycomb substrate 22 to be suppressed when the voltage is applied between the pair of electrode portions 25, so that the bias of heat generation in the pillar shaped ceramic honeycomb substrate 22 can be suppressed.

It should be noted that a pair of electrode portions 25 may be provided, but a plurality of pairs may be provided from the viewpoint of increasing a heat generation efficiency of the pillar shaped ceramic honeycomb substrate 22.

Further, the application of the voltage to the pair of the electrode portions 25 preferably heats the pillar shaped ceramic honeycomb substrate 22 such that the temperature of the first end face 26a is 900° C. or less. The temperature of the first end face 26a can be controlled by directly providing a temperature measuring means on the pillar shaped ceramic honeycomb substrate 22. Alternatively, it is also possible to estimate the temperature of the first end face 26a from a temperature of an exhaust gas, a flow rate of the exhaust gas, and an amount of the reductant precursor 50 sprayed. Further, if operating conditions of the engine are mapped, it may be replaced with the measurement of the temperature of the exhaust gas and the flow rate of the exhaust gas.

The material of the electrode portions 25 is preferably the same as the main component of the partition wall 24 of the pillar shaped ceramic honeycomb substrate 22, although not particularly limited thereto.

The electrode portions 25 preferably have an electrical resistivity of from 0.0001 to 100 Ωcm, and more preferably from 0.001 to 50 Ωcm. The electrical resistivity of the electrode portions 25 in such a range can allow the pair of electrode portions 25 to effectively play the role of electrodes in an exhaust gas pipe through which an exhaust gas having elevated temperature flows. The electrical resistivity of the electrode portions 25 is preferably lower than that of the pillar shaped ceramic honeycomb substrate 22.

The electrical resistivity of the electrode portions 25 is a value at 25° C. The electrical resistivity of the electrode portions 25 is a value measured by the four-terminal method.

(1-3) Cylindrical Member 30 and Insulation Maintaining Portion 40

The reductant generation device 100 can further include a cylindrical member 30 and an insulation maintaining portion 40, as shown in FIG. 1. In this case, it is preferable that the heater 20 is housed in the cylindrical member 30, and the heater 20 and the cylindrical member 30 are fixed via the insulating maintaining portion 40. Such a structure can ensure insulation between the cylindrical member 30 and the pillar shaped ceramic honeycomb substrate 22 on which the pair of electrode portions 25 are arranged.

The cylindrical member 30 is preferably made of stainless steel or the like, although not particularly limited thereto.

In order fit the cylindrical member 30 to the pillar shaped ceramic honeycomb substrate 22, the cylindrical member 30 preferably has the same type of shape as that of the pillar shaped ceramic honeycomb substrate 22 in the cross section orthogonal to the extending direction of the cells 27. As use herein, "the same type of shape" means that when the shape of the cylindrical member 30 is square, the shape of the pillar shaped ceramic honeycomb substrate 22 is also square, and when the shape of the cylindrical member 30 is rectangular, the shape of the pillar shaped ceramic honeycomb substrate 22 is also rectangular. For example, when the shapes of the cylindrical member 30 and the pillar shaped ceramic honeycomb substrate 22 are of the same type and their shapes are rectangular, it is not necessary for both to have the same ratio of the length to the width.

The outer surface of the cylindrical member 30 may be provided with a connector 29 for connecting an electrical wiring 28 from the outside to the electrode portions 25.

The insulation maintaining portion 40 is arranged between the cylindrical member 30 and the pillar shaped ceramic honeycomb substrate 22 on which the pair of electrode portions 25 are arranged. If the insulation maintaining portion 40 can hold a distance between the pillar shaped ceramic honeycomb substrate 22 on which the pair of electrode portions 25 are arranged and the cylindrical member 30, there may be a portion (space) where the insulation maintaining portion 40 is not arranged, but the insulation maintaining portion 40 may be arranged throughout the distance.

The material of the insulation maintaining portion 40 is not particularly limited as long as it has good insulating properties, but alumina is preferable.

The reductant generation device 100 having the structure as described above can be produced according to a method known in the art. Specifically, the reductant generation device 100 can be produced as follows:

First, the sprayer 10, the heater 20, the cylindrical member 30 having the connector 29 arranged on the outer surface, the insulation maintaining portion 40, and the electrical wiring 28 are prepared. The heater 20 is then inserted into the cylindrical member 30, and the heater 20 is fixed via the insulation maintaining portion 40, and the sprayer 10 is arranged at one end of the cylindrical member 30. The connector 29 of the cylindrical member 30 and the pair of electrode portions 25 of the heater 20 may be then connected by the electrical wiring 28.

Next, a typical method for producing the heater 20 will be described.

First, a forming raw material is extruded to produce a honeycomb formed body having the same structure as that of the pillar shaped ceramic honeycomb substrate 22. The forming raw material preferably contains a ceramic raw material and an organic binder. In addition to the ceramic raw material and the organic binder, the forming raw material may further contain a surfactant, a sintering aid, a pore former, water, and the like. The forming raw material can be obtained by mixing these raw materials.

The ceramic raw material in the forming raw material is "ceramics" or "a raw material that will form ceramics by firing". In any case, the ceramic raw material will form ceramics after firing. The ceramic raw material in the forming raw material preferably contains metallic silicon and silicon carbide particles (silicon carbide powder) as main components, or silicon carbide particles (silicon carbide powder) as a main component. This can provide the resulting pillar shaped ceramic honeycomb substrate 22 with conductivity. The metallic silicon is also preferably metallic silicon particles (metallic silicon powder). The phrase "contains metallic silicon and silicon carbide particles as main components" means that the total mass of the metallic silicon and silicon carbide particles is 90% by mass or more of the whole (ceramic raw material). Examples of components other than the main components contained in the ceramic raw material include $SiO_2$, $SrCO_3$, $Al_2O_3$, $MgCO_3$, and cordierite.

When the silicon carbide is used as the main component of the ceramic raw material, the silicon carbide is sintered by firing. Further, when the metallic silicon and the silicon carbide particles are used as the main components of the ceramic raw material, the silicon carbide particles as an aggregate are bonded to each other with the metallic silicon as a binder by firing.

When the silicon carbide particles (silicon carbide powder) and the metal silicon particles (metal silicon powder) are used as the ceramic raw materials, the mass of the metal silicon particles is preferably from 10 to 40% by mass, based on the total mass of the silicon carbide particles and the metal silicon particles.

Examples of the organic binder include methyl cellulose, glycerin, and hydroxypropyl methyl cellulose. As the organic binder, one type of organic binder may be used, or a plurality of types of organic binders may be used. An amount of the organic binder blended is preferably from 5 to 10 parts by mass, when the total mass of the ceramic raw materials is 100 parts by mass.

As the surfactant, ethylene glycol, dextrin and the like can be used. As the surfactant, one type of surfactant may be used, or a plurality of types of surfactants may be used. An amount of the surfactant blended is preferably from 0.1 to 2.0 parts by mass, when the total mass of the ceramic raw materials is 100 parts by mass.

The sintering aid that can be used includes $SiO_2$, $SrCO_3$, $Al_2O_3$, $MgCO_3$, cordierite and the like. As the sintering aid, one type of sintering aid may be used, or a plurality of types of sintering aids may be used. An amount of the sintering aid blended is preferably from 0.1 to 3 parts by mass, when the total mass of the ceramic raw materials is 100 parts by mass.

The pore former is not particularly limited as long as it forms pores after firing. Examples include graphite, starch, foamed resins, water-absorbent resins, and silica gel. As the pore former, one type of pore former may be used, or a plurality of types of pore formers may be used. An amount of the pore former blended is preferably from 0.5 to 10 parts by mass, when the total mass of the ceramic raw materials is 100 parts by mass.

An amount of water blended is preferably from 20 to 60 parts by mass, when the total mass of the ceramic raw materials is 100 parts by mass.

When the forming raw material is extruded, first, the forming raw material is kneaded to prepare a green body. The green body is then extruded to obtain a honeycomb formed product. The honeycomb formed body has an outer peripheral wall 23; and a porous partition wall 24 disposed on an inner side of the outer peripheral wall 23, which defines the cells 27 each extending from the first end face 26a to the second end face 26b. The partition wall 24 of the honeycomb formed body is non-dried and non-fired partition wall 24.

The resulting honeycomb formed body is then dried to prepare a honeycomb dried body. The drying conditions are not particularly limited, and known conditions can be used. For example, it is preferable to dry the honeycomb formed body at a temperature of from 80 to 120° C. for 0.5 to 5 hours.

Subsequently, after an electrode forming slurry containing the ceramic raw material and water is applied to the side surface of the honeycomb dried body, the electrode forming slurry is dried to form a pair of unfired electrode portions to produce a honeycomb body with unfired electrode portions.

For the honeycomb body with unfired electrode portions, the honeycomb dried body is preferably provided with wide rectangular unfired electrode portions each extending in the form of the band in the extending direction of the cells 27, and also spreading in a circumferential direction. The circumferential direction refers to a direction along the side surface of the dried honeycomb body in the cross section orthogonal to the extending direction of the cells 27.

The electrode forming slurry used in the production step of the honeycomb body with unfired electrode portions contains a ceramic raw material and water. The electrode forming slurry may contain a surfactant, a pore former, water, and the like.

As the ceramic raw material used for the electrode forming slurry, it is preferable to use the ceramic raw material used when producing the honeycomb formed body. For example, when the main components of the ceramic raw material used when producing the honeycomb formed body are the silicon carbide particles and the metallic silicon, the silicon carbide particles and the metallic silicon may also be used as the ceramic raw materials of the electrode forming slurry.

A method of applying the electrode forming slurry to the side surface of the dried honeycomb body is not particularly limited. The electrode forming slurry may be applied, for example, by using a brush or by using a printing technique.

After applying the electrode forming slurry to the honeycomb dried body, the electrode forming slurry can be dried to obtain unfired electrode portions (the honeycomb body with unfired electrode portions). The drying temperature is preferably from 80 to 120° C. The drying time is preferably from 0.1 to 5 hours.

The honeycomb body with the unfired electrode portions is then fired to produce a honeycomb structure (pillar shaped ceramic honeycomb substrate 22).

The firing conditions may be appropriately determined according to the types of the ceramic raw material used in the production of the honeycomb formed body and the ceramic raw material used in the electrode forming slurry.

Further, calcination is preferably carried out after drying the honeycomb formed body with the unfired electrode portions and before the firing, in order to remove the binder and the like. The calcination is preferably carried out in an air atmosphere at a temperature of from 400 to 500° C. for 0.5 to 20 hours.

<Method for Controlling Reductant Generation Device>

The control method for the reductant generation device according to an embodiment of the present invention is a method for controlling the reductant generation device 100 having the structure as described above, and the method includes: a permeation step of spraying the reductant precursor 50 from the sprayer 10 and permeating the ceramic substrate 21 with the reductant precursor 50 when the heater 20 is not heated; and after the permeation step, a heating step A of heating the reductant precursor 50 by the heater 20, and generating the reductant 60 while spraying the reductant precursor 50 from the sprayer 10.

Here, first, a conventional control method for the reductant generation device 100 will be described with reference to the flowchart of FIG. 2.

Figure 2:
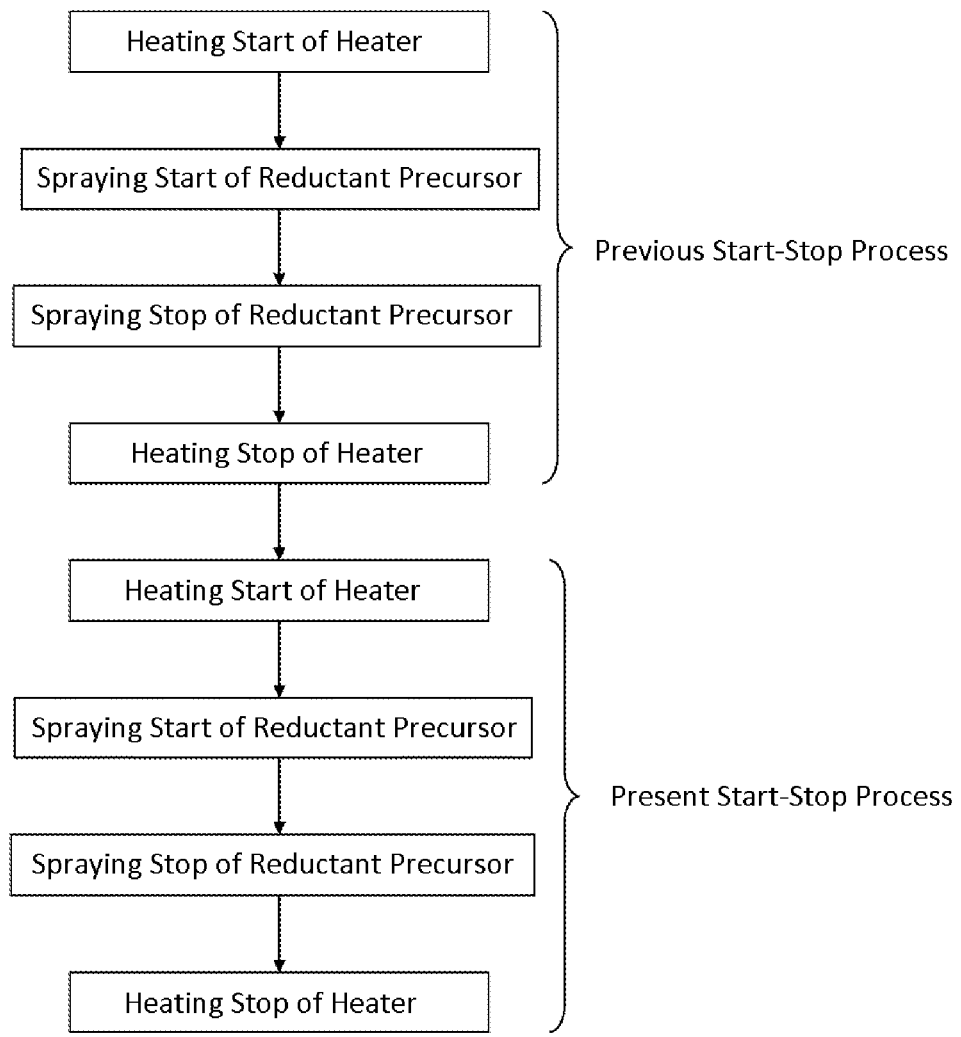
FIG. 2 is a flowchart for explaining a conventional control method for a reductant generation device.

As shown in FIG. 2, in the conventional control method, when starting the reductant generation device 100, the heater 20 is heated to a predetermined temperature, and the reductant precursor 50 is then sprayed from the sprayer 10. When stopping the reductant generation device 100, the heating of the heater 20 is stopped after the spraying of the reductant precursor 50 is stopped. Such a start-stop process is repeated each time the reductant generation device 100 is used.

When stopping the reductant generation device 100 in the previous start-stop process, the heating of the heater 20 is stopped after stopping the spraying of the agent precursor 50 in order to prevent the reductant precursor 50 (e.g., urea) remaining on the ceramic substrate 21 of the heater 20 from being deposited. Therefore, in general, the reductant precursor 50 does not remain on the ceramic substrate 21 of the heater 20 when the reductant generation device 100 is stopped.

Accordingly, when starting the reductant generation device 100 in this start-stop process, the spraying of the reductant precursor 50 from the sprayer 10 after heating the heater 20 to a predetermined temperature causes the ceramic substrate 21 to be first permeated with the sprayed reductant precursor 50, so that the temperature of the heater 20 is temporarily decreased. Subsequently, when the heater 20 is heated again to a predetermined temperature, the reductant precursor 50 is thermally decomposed to generate the reductant 60. Thus, the conventional control method for the reductant generation device 100 causes a problem that it takes a long period of time for the reductant precursor 50 to be thermally decomposed to generate the reductant 60 after the reductant precursor 50 is sprayed from the sprayer 10, and it is difficult to rapidly generate the reductant 60.

On the other hand, in the control method for the reductant generation device 100 according to the embodiment of the present invention, the reductant precursor 50 is sprayed from the sprayer 10 to permeate the ceramic substrate 21 with the reductant precursor 50 when the heater 20 is not heated, and then heating the reductant precursor 50 by the heater 20, so that the reductant 60 can be generated more rapidly than in the conventional control method. Moreover, since the reductant precursor 50 is then sprayed from the sprayer 10, the reductant 60 can be continuously generated.

Here, a typical example of the control method for the reductant generation device 100 according to the embodiment of the present invention will be described with reference to the flowcharts of FIGS. 3 and 4.

Figure 3:
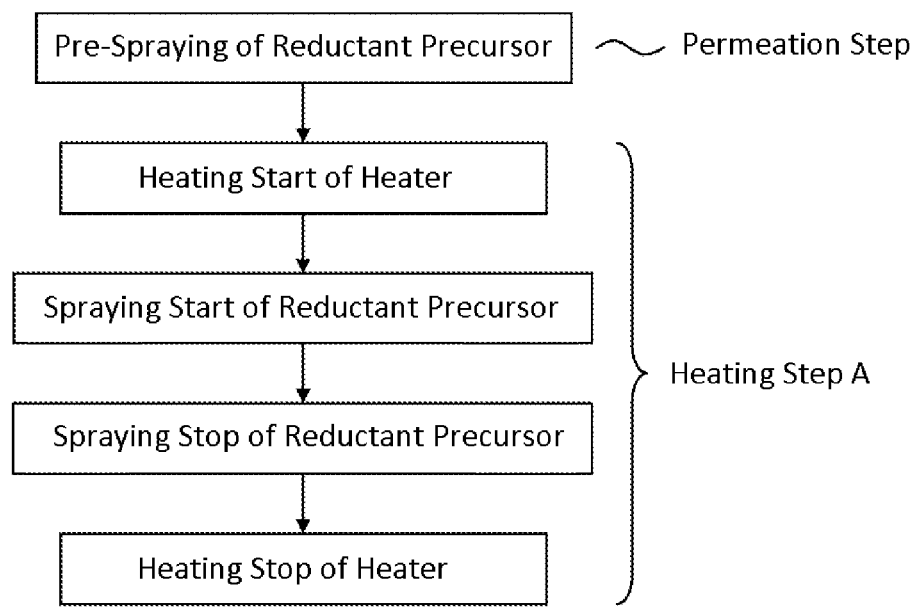
FIG. 3 is a flowchart for explaining a control method for a reductant generation device according to an embodiment of the invention.

FIG. 3 shows a control method for the reductant generation device 100 including the heating step A after the permeation step.

The permeation step includes a pre-spraying step of the reductant precursor 50. Specifically, the permeation step is to previously spray the reductant precursor 50 from the sprayer 10 and permeate the ceramic substrate 21 with the reductant precursor 50, when the heater 20 is not heated.

The heating step A includes a heating start step of the heater 20 and a spraying start step of the reductant precursor 50. Specifically, the heating step A is to heat the reductant precursor 50 by the heater 20 and generate the reductant 60 while spraying the reductant precursor 50 from the sprayer 10. Further, the heating step A can further include a spraying stop step of the reductant precursor 50 and a heating stop step of the heater 20 in order to stop the reductant generation device 100. It should be noted that although FIG. 3 shows an example in which the spraying stop step of the reductant precursor 50 is followed by the heating stop step of the heater 20, the heating stop step of the heater 20 may be followed by the spraying stop step of the reductant precursor 50. Further, the spraying start step of the reductant precursor 50 and the heating start step of the heater 20 may be performed at substantially the same time. The permeation step and the heating step A are repeated each time the reductant generation device 100 is used.

Figure 4:
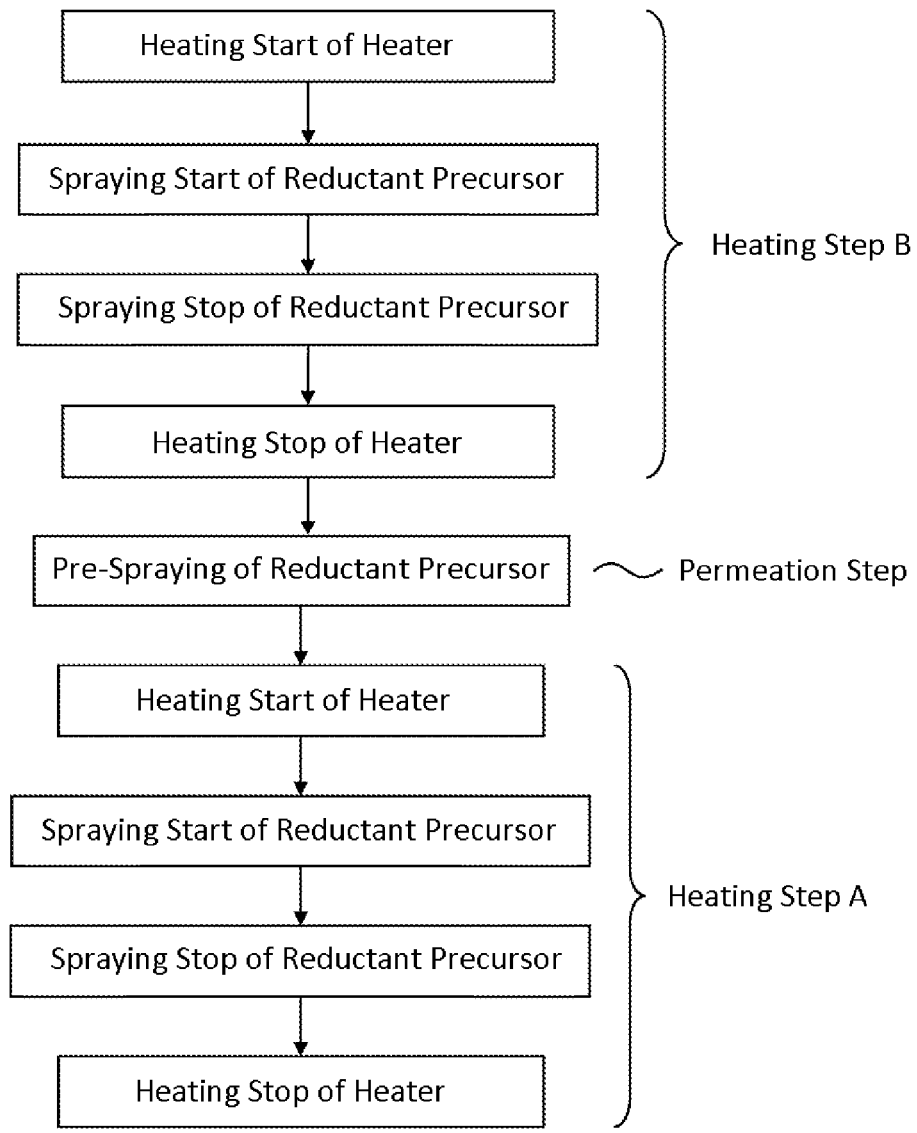
FIG. 4 is a flowchart for explaining a control method for a reductant generation device according to an embodiment of the invention.

FIG. 4 is a control method for the reductant generation device 100 further including a heating step B before the permeation step. That is, in the control method, the heating step B, the permeation step, and the heating step A are performed in this order.

The heating step B includes a heating start step of the heater 20 and a spraying start step of the reductant precursor 50. Specifically, the heating step B is to heat the reductant precursor 50 by the heater 20 and generate the reductant 60 while spraying the reductant precursor 50 from the sprayer 10. Further, the heating step B can further include a spraying stop step of the reductant precursor 50 and a heating stop step of the heater 20 in order to stop the reductant generation device 100. It should be noted that although FIG. 4 shows an example in which the heating stop step of the heater 20 is performed after the spraying stop step of the reductant precursor 50, the spraying stop step of the reductant precursor 50 may be performed after the heating stop step of the heater 20. Further, in the heating step B, the heating start step of the heater 20 and the spraying start step of the reductant precursor 50 may be performed at substantially the same time.

Figure 5:
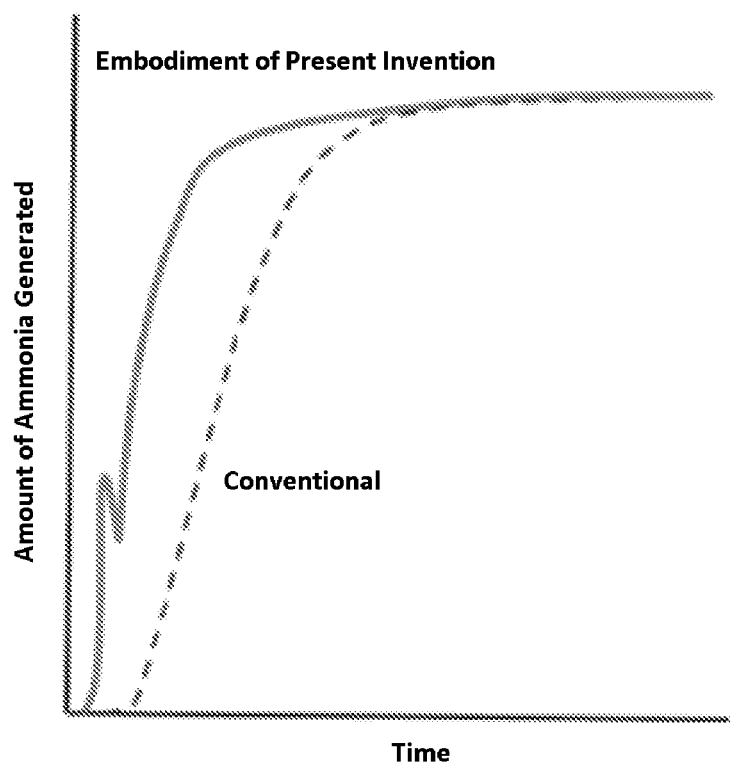
FIG. 5 is a graph showing a relationship between a time and an amount of ammonia (reductant) generated in a control method for a reductant generation device according to an embodiment of the present invention and a conventional control method for a reductant generation device.

Here, FIG. 5 shows a relationship between a time and an amount of ammonia (reductant 60) generated for each of the control method for the reductant generation device 100 according to the embodiment of the present invention according to the flowchart of FIG. 3 and the control method for the conventional reductant generation device 100 according to the flowchart of FIG. 2. As shown in FIG. 5, the control method for the reductant generation device 100 according to the embodiment of the present invention can generate ammonia more rapidly than the control method for the conventional reductant generation device 100.

In the permeation step, the reductant precursor 50 in the ceramic substrate 21 preferably has a permeability of 5 to 75% of the total pore volume of the ceramic substrate 21. The permeability of the reductant precursor 50 of 5% or more tends to stably ensure rapid generation of the reductant 60. Further, the permeability of the reductant precursor 50 of 75% or less can suppress the formation of deposits of the reductant precursor 50 that has permeated the ceramic substrate 21. It can also prevent a part of the reductant precursor 50 from being thermally decomposed and released as it is.

Here, the permeability of the reductant precursor 50 can be determined by the following equation (1):

$$\text{Permeability [\%] of reductant precursor 50} = \text{mass [g]}$$
of reductant precursor 50 permeating ceramic substrate 21/(total pore volume [cc] of ceramic substrate 21×density of reductant precursor 50 [g/cc]) (1)

For example, when AdBlue (an aqueous urea solution containing 32.5% by mass of urea; registered trademark of Verband der Automobilindustrie (VDA)) is used as the reductant precursor 50, the density of the aqueous urea solution can be determined by the following equation (2):

$$\text{Density of aqueous urea solution [g/cc]} = \text{density of urea}\times 0.325 + \text{density of water}\times 0.675 \quad (2)$$

The total pore volume is a value measured by the mercury intrusion technique. Examples of the mercury porosimeter include Autopore 9500™ from Micrometrics.

The reductant precursor 50 used in the control method for the reductant generation device 100 is not particularly limited, and it may be appropriately selected according to the type of the reductant 60 to be generated.

For example, when the reductant 60 is ammonia, an aqueous urea solution can be selected as the reductant precursor 50.

The reductant 60 obtained by the control method for the reductant generation device 100 can be used for various applications requiring the reductant 60.

For example, when the reductant 60 is ammonia, it can be used for treating an exhaust gas containing NOx (nitrogen oxides).

When the aqueous urea solution is used as the reductant precursor 50, the heating step sprays the reductant precursor 50 from the sprayer 10 and heats the reductant precursor 50 by the heater 20. More particularly, when the reductant precursor 50 is sprayed from the sprayer 10 onto the first end face 26a of the pillar shaped ceramic honeycomb substrate 22, the reductant precursor 50 is fed into the cells 27 of the pillar shaped ceramic honeycomb substrate 22. The urea in the aqueous urea solution fed into the cells 27 is decomposed by the temperature of the heated pillar shaped ceramic honeycomb substrate 22 to generate ammonia (reductant 60), and discharged from the second end face 26b of the pillar shaped ceramic honeycomb substrate 22.

When the generated ammonia is used for treating the exhaust gas containing NOx, the amount of the aqueous urea solution fed is preferably from 1.0 to 2.0 in an equivalent ratio to the amount of nitrogen oxides (NOx) contained in the exhaust gas. If the equivalent ratio is less than 1.0, the amount of NOx discharged without purification may increase. However, if the SCR catalyst is provided with a NOx storage function, there may be a period during which the equivalent ratio is less than 1.0. If the equivalent ratio is more than 2.0, there is an increased risk that the exhaust gas is discharged with the ammonia mixed in the exhaust gas.

The reductant precursor 50 is preferably an aqueous solution containing from 10 to 40% by mass of urea, although not particularly limited thereto. If the urea content is less than 10% by mass, it is necessary to spray a large amount of the aqueous urea solution in order to reduce NOx, and an amount of electric power required for conducting the current to heat the pillar shaped ceramic honeycomb substrate 22 may increase. If the urea content is more than 40% by mass, there is a concern that the aqueous urea solution will solidify in cold regions. Preferable examples of the aqueous urea solution include AdBlue (an aqueous solution containing 32.5% by mass of urea) as described above.

The heating temperature of the pillar shaped ceramic honeycomb substrate 22 is preferably 160° C. or higher, and more preferably from 160 to 600° C., and even more preferably from 250 to 400° C., although not particularly limited thereto. The heating temperature of 160° C. or higher can lead to easy and efficient decomposition of the urea. The heating temperature of 600° C. or lower can allow the ammonia to be burned out and prevent the ammonia from being insufficiently fed.

The maximum voltage applied to the pillar shaped ceramic honeycomb substrate 22 is preferably from 12 to 200 V, and more preferably from 12 to 100 V, and even more preferably from 12 to 48 V. The maximum voltage of 12 V or more can allow the temperature of the pillar shaped ceramic honeycomb substrate 22 to be easily increased. The maximum voltage of 200 V or less can prevent a device for increasing the voltage from becoming expensive.

<Reductant Generation System>

The reductant generation system according to an embodiment of the present invention includes: the reductant generation device 100 having the structure as described above; and a control device including a reductant precursor spray control unit for controlling the spraying of the reductant precursor 50 from the sprayer 10 and a heater control unit for controlling the heating of the reductant precursor 50 by the heater 20. Then, the reductant precursor spray control unit generates a control signal for spraying the reductant precursor 50 from the sprayer 10 when the heater 20 is not heated, and controls the reductant generation system so that the reductant precursor 50 can permeate the ceramic substrate 21. By performing such control, the reductant 60 can be rapidly generated.

The permeation step is the same as the control method for the reductant generation device 100, so the descriptions thereof will be omitted.

The control device is not particularly limited, but it may be a computer. For example, when the reductant generation system is used in an exhaust gas purification system, the control device can be an ECU (engine control unit). The ECU is configured to include, for example, a CPU (Central Processing Unit), a ROM (Read Only Memory), a RAM (Random Access Memory), an input port, an output port, and the like. Each function of the ECU, which will be described later, is achieved, for example, by the CPU referring to control programs and various data stored in ROM, RAM, or the like. However, the function is not limited to processing by the software, and it can be achieved by a dedicated hardware circuit. By communicating with the sprayer 10, the heater 20, and the like, the ECU can control them and acquire their state information.

The reductant precursor spray control unit generates control signals for controlling the amount of the aqueous urea solution (reductant precursor 50) sprayed from the sprayer 10, the presence or absence of spraying (timing, etc.), the spraying time, and the like. The reductant precursor spray control unit can control the amount of the reductant precursor sprayed, so that the permeability of the aqueous urea solution in the ceramic substrate 21 is 5 to 75% of the total pore volume of the ceramic substrate.

The heater control unit generates control signals for controlling the power applied to the heater 20 in order to control the heating temperature of the heater 20, the presence or absence of heating (timing, etc.), the heating time, and the like.

<Exhaust Gas Purification Method>

The exhaust gas purification method according to an embodiment of the present invention includes bringing the reductant 60 generated by the control method for the reductant generation device 100 as described above into contact with the exhaust gas containing NOx.

Since the control method for the reductant generation device 100 as described above can rapidly generate the reductant 60, according to the exhaust gas purification method, the reductant 60 can be rapidly generated immediately after the engine is started to perform the exhaust gas purification.

The exhaust gas purification method according to the embodiment of the present invention can bring the reductant 60 into contact with the exhaust gas, and then perform a reduction treatment using the SCR catalyst. This can lead to efficient removal of NOx in the exhaust gas.

<Exhaust Gas Purification System>

The exhaust gas purification system according to an embodiment of the present invention includes the reductant generation system as described above. Further, the reductant generation device 100 of the reductant generation system is provided in an exhaust pipe through which the exhaust gas containing NOx can flow or a branch pipe connected to the exhaust pipe.

Since the reductant generation system as described above can rapidly generate ammonia (the reductant 60), according to the exhaust gas purification system, the ammonia can be rapidly generated immediately after the engine is started, to perform the exhaust gas purification.

The amount of the ammonia fed from the reductant generation device 100 to the exhaust pipe is preferably from 1.0 to 2.0 in an equivalent ratio to the amount of NOx contained in the exhaust gas, although not particularly limited thereto. If the equivalent ratio is less than 1.0, the amount of NOx discharged without purification may increase. If the equivalent ratio is more than 2.0, there is an increased risk that the exhaust gas is discharged with the ammonia mixed in the exhaust gas.

EXAMPLES

Hereinafter, the present invention will be described in more detail with reference to Examples. However, the present invention is not limited to these Examples.

<Production of Reductant Generation Device>

The reductant generation device as shown in FIG. 1 was produced. A specific production method is as follows:

Silicon carbide (SiC) powder and metallic silicon (Si) powder were mixed at a mass ratio of 70:30 to prepare a ceramic raw material. To the ceramic raw material were added hydroxypropyl methyl cellulose as a binder and a water-absorbing resin as a pore former, and water was further added to prepare a forming raw material. The forming raw material was kneaded by a vacuum green body kneader to prepare a green body. The content of the binder was 7 parts by mass based on 100 parts by mass of the ceramic raw material. The content of the pore former was 3 parts by mass based on 100 parts by mass of the ceramic raw material. The content of water was 42 parts by mass based on 100 parts by mass of the ceramic raw material. The average particle diameter of the silicon carbide powder was 20 μm, and the average particle diameter of the metallic silicon powder was 6 μm. The average particle diameter of the pore former was 20 μm. The average particle diameter of each of silicon carbide, metallic silicon, and the pore former is a value measured by a laser diffraction method.

The resulting green body was formed using an extrusion molding machine to obtain a honeycomb formed body having a cylindrical shape (the cross section orthogonal to the extending direction of the cells was circular). The obtained honeycomb formed body was dried by high-frequency dielectric heating, and then dried at 120° C. for 2 hours using a hot air dryer, and both end faces were cut by a predetermined amount to obtain a honeycomb dried body.

Subsequently, silicon carbide (SiC) powder and metallic silicon (Si) powder were mixed at a mass ratio of 60:40 to prepare an electrode ceramic raw material. To the electrode ceramic raw material were added hydroxypropyl methyl cellulose as a binder, glycerin as a moisturizing agent, and a surfactant as a dispersant, and water was further added and mixed. The mixture was then kneaded to obtain an electrode forming slurry. The content of the binder was 0.5 parts by mass based on 100 parts by mass of the electrode ceramic raw material. The content of glycerin was 10 parts by mass based on 100 parts by mass of the electrode ceramic raw material. The content of the surfactant was 0.3 parts by mass based on 100 parts by mass of the electrode ceramic raw material. The content of water was 42 parts by mass based on 100 parts by mass of the electrode ceramic raw material. The silicon carbide powder had an average particle diameter of 52 μm, and the metallic silicon powder had an average particle diameter of 6 μm. Each of the average particle diameters of silicon carbide and metallic silicon is a value measured by a laser diffraction method. The kneading was performed by a vertical agitator.

The electrode forming slurry was then applied to the side surface of the honeycomb dried body so as to form a pair of bands, and the electrode forming slurry was then dried to form a pair of unfired electrode portions, thereby obtaining a honeycomb body with unfired electrode portions. The drying temperature of the electrode forming slurry was 70° C.

Subsequently, after degreasing the honeycomb body with the unfired electrode portions, it was fired and further oxidized to obtain a heater. The degreasing conditions were at 550° C. for 3 hours. The firing conditions were in an argon atmosphere at 1450° C. for 2 hours. The conditions for the oxidation treatment were at 1300° C. for 1 hour.

In the obtained heater, the thickness of each partition wall 24 was 0.152 mm, and the cell pitch was 1.11 mm. The surface area of the pillar shaped ceramic honeycomb substrate per unit volume was 31.1 $cm^2/cm^3$. The pillar shaped ceramic honeycomb substrate had a rectangular pillar shape having square end faces, one side of each end face being 30 mm, and the length in the extending direction of the cells being 25 mm. The electrical resistivity of the electrode portions was 0.1 Ωcm, and the electrical resistivity of the pillar shaped ceramic honeycomb substrate was 1.4 Ωcm.

Subsequently, the cylindrical member was made of stainless steel and two connectors were attached to its outer surface. The heater was inserted into the cylindrical member, and the heater was fixed via the insulation maintaining portion made of alumina, and the solenoid sprayer was arranged at one end of the cylindrical member. Also, the connectors of the cylindrical member and the pair of electrode portions of the heater were connected together by electric wiring.

<Reductant Generation Test>

Figure 6:
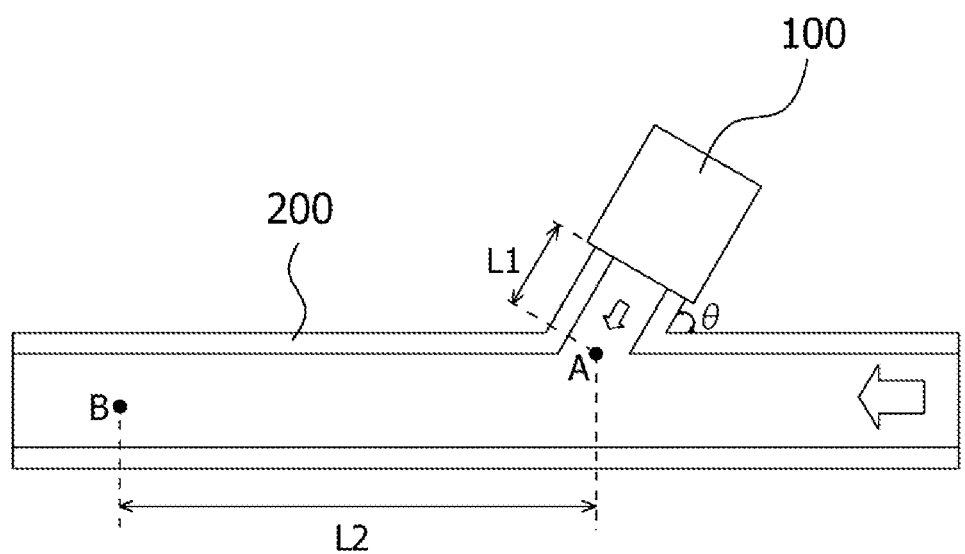
FIG. 6 is a schematic cross-sectional view for explaining a reductant generation test in Examples.

A reductant generation test was conducted by attaching the reductant generation device obtained above to the exhaust pipe. In this test, AdBlue (the aqueous urea solution containing 32.5% by weight of urea; registered trademark of Verband der Automobilindustrie (VDA)) was used as the reductant precursor, and the evaluation was performed by measuring the time until a predetermined amount of ammonia (reductant) was generated. Further, the leakage of the aqueous urea solution (reductant precursor) (which means that the urea aqueous solution is discharged as it is from the reductant generation device) was also evaluated. A specific test method is as follows:

First, the reductant generation device 100 was installed in the exhaust pipe 200 as shown in FIG. 6. The reductant generation device 100 was installed in a branch pipe branched at an angle θ of 45° and connected to the exhaust pipe 200. Further, a distance L1 between a midpoint A of the branched portion where the reductant generation device 100 was installed and the reductant generation device 100 was set to 10 mm.

Subsequently, in the reductant generation device 100, the aqueous urea solution was previously sprayed from the sprayer so as to have each permeability as shown in Table 1 before heating of the heater, and permeated the pillar shaped ceramic honeycomb substrate (permeation step). However, for the test No. 1, the permeation step was not performed.

The permeability of the aqueous urea solution was calculated according to the above equation (1). The mass (penetration amount) of the aqueous urea solution that permeated the pillar shaped ceramic honeycomb substrate was calculated by subtracting the mass of the pillar shaped ceramic honeycomb substrate before spraying the aqueous urea solution from the mass of the pillar shaped ceramic honeycomb substrate after spraying the aqueous urea solution. The permeation amount of the aqueous urea solution was measured by removing the pillar shaped ceramic honeycomb substrate from the reductant generation device 100. Further, the density of the aqueous urea solution was calculated according to the formula (2) as described above.

Subsequently, the aqueous urea solution was sprayed from the sprayer at an amount of 1.0 g/min, and a voltage of about 39 V was applied to the pillar shaped ceramic honeycomb substrate to heat the heater, thereby generating ammonia (heating step). The maximum voltage applicable from the power source to the pillar shaped ceramic honeycomb substrate was set to 48V. Then, 650 mL/min of air was passed through the exhaust pipe 200, and the time until 20 ppm and 100 ppm of ammonia were detected was measured. The measurement was performed at a measurement point B in the exhaust pipe 200 at a distance L2 of 600 mm from the center of the exhaust pipe 200 corresponding to the midpoint A of the branch where the reductant generation device 100 was installed.

Further, the exhaust pipe 200 was visually observed for the leakage of the aqueous urea solution, and if there was no deposition of urea in the exhaust pipe 200, it was evaluated as no leakage of the aqueous urea solution (A). Conversely, if there was deposition of urea inside the exhaust pipe 200, it was evaluated as leakage of the aqueous urea solution (B).

Table 1 shows the above evaluation results.

TABLE 1

| Test Nos. | Permeability (%) | Detection Time (s) 20 ppm | Detection Time (s) 100 ppm | Leakage of Aqueous Ure solution | Category |
|---|---|---|---|---|---|
| 1 | 0 | 1.2 | 3.2 | A | Comparative Example |
| 2 | 5 | 0.8 | 1.0 | A | Example |
| 3 | 50 | 0.2 | 0.6 | A | Example |
| 4 | 75 | 0.1 | 0.2 | A | Example |
| 5 | 90 | 0.1 | 0.2 | B | Example |

As shown in Table 1, it was found that each of the control methods according to Test Nos 2 to 5 (Examples of the present invention) in which the permeation step was performed had the shorter time during which 20 ppm and 100 ppm of ammonia was detected, and also could rapidly generate ammonia, as compared to the control method according to Test No. 1 (Comparative Example) in which the permeation step was not performed.

As can be seen from the above results, according to the present invention, it is possible to provide a control method for a reductant generation device and a reductant generation system, which can rapidly generate a reductant. Also, according to the present invention, it is possible to provide an exhaust gas purification method and an exhaust gas purification system, which can rapidly generate a reductant to perform exhaust gas purification immediately after an engine is started.

DESCRIPTION OF REFERENCE NUMERALS 10 sprayer
20 heater
21 ceramic substrate
22 pillar shaped ceramic honeycomb substrate
23 outer peripheral wall
24 partition wall
25 electrode portion
26a first end face
26b second end face
27 cell
28 electric wiring
29 connector
30 cylindrical member
40 insulation maintaining portion
50 reductant precursor
60 reductant
100 reductant generation device
200 exhaust pipe

The invention claimed is:

1. A method for controlling a reductant generation device, the reductant generation device comprising: a sprayer capable of spraying a reductant precursor; and a heater comprising a ceramic substrate, the heater being arranged on a downstream side of the sprayer and capable of heating the reductant precursor to generate a reductant, the method comprising:
   a permeation step of spraying the reductant precursor from the sprayer and permeating the ceramic substrate with the reductant precursor when the heater is not heated; and
   after the permeation step, a heating step A of heating the reductant precursor by the heater and generating the reductant while spraying the reductant precursor from the sprayer.

2. The method according to claim 1, wherein the reductant precursor in the ceramic substrate in the permeation step has a permeability of 5 to 75% of the total pore volume of the ceramic substrate.

3. The method according to claim 1, wherein the method further comprises a heating step B of heating the reductant precursor by the heater and generating the reductant while spraying the reductant precursor from the sprayer,
   wherein the heating step B, the permeation step and the heating step A are performed in this order.

4. The method according to claim 1, wherein the reductant precursor is an aqueous urea solution and the reductant is ammonia.

5. The method according to claim 1, wherein the heater comprises: a pillar shaped ceramic honeycomb substrate having an outer peripheral wall, and a partition wall arranged on an inner side of the outer peripheral wall, the partition wall defining a plurality of cells, each of the cells forming a flow path from a first end face to a second end face; and a pair of electrode portions disposed on a side surface of the pillar shaped ceramic honeycomb substrate,
   wherein the pillar shaped ceramic honeycomb substrate generates heat by electrical conduction.

6. The method according to claim 1, wherein the heater is housed in a cylindrical member, and the heater and the cylindrical member are fixed via an insulation maintaining portion.

7. A method for purifying an exhaust gas, the method comprising bringing the reductant generated by the method according to claim 1 into contact with an exhaust gas containing NOx.

8. A reductant generation system, the reduction generation system comprising:
   a reductant generation device comprising: a sprayer capable of spraying a reductant precursor; and a heater comprising a ceramic substrate, the heater being arranged on a downstream side of the sprayer and capable of heating the reductant precursor to generate a reductant; and
   a control device comprising: a reductant precursor spray control unit for controlling spraying of the reductant precursor from the sprayer; and a heater control unit for controlling heating of the reductant precursor by the heater,
   wherein the reductant precursor spray control unit generates a control signal for spraying the reductant precursor from the sprayer when the heater is not heated, and controls the reductant generation system such that the ceramic substrate can be permeated with the reductant precursor.

9. The reductant generation system according to claim 8, wherein the reductant precursor spray control unit controls an amount of the reductant precursor sprayed so that a permeability of the reductant precursor in the ceramic substrate is 5 to 75% of the total pore volume of the ceramic substrate.

10. The reductant generation system according to claim 8, wherein the heater comprises: a pillar shaped ceramic honeycomb substrate having an outer peripheral wall, and a partition wall arranged on an inner side of the outer peripheral wall, the partition wall defining a plurality of cells, each of the cells forming a flow path from a first end face to a second end face; and a pair of electrode portions disposed on a side surface of the pillar shaped ceramic honeycomb substrate,
   wherein the pillar shaped ceramic honeycomb substrate generates heat by electrical conduction.

11. The reductant generation system according to claim 8, wherein the heater is housed in a cylindrical member, and the heater and the cylindrical member are fixed via an insulation maintaining portion.

12. An exhaust gas purification system comprising the reductant generation system according to claim 8,
   wherein the reductant generation device is provided in an exhaust pipe through which an exhaust gas containing NOx can flow or in a branch pipe connected to the exhaust pipe.

* * * * *